United States Patent [19]

Maehara et al.

[11] Patent Number: 4,555,145
[45] Date of Patent: Nov. 26, 1985

[54] ANTI-LOCK SYSTEM FOR VEHICLES

[75] Inventors: Toshifumi Maehara, Hanazono; Hiroyuki Yoshizawa, Hasuda, both of Japan

[73] Assignee: Akebono Brake Industry Company Ltd., Japan

[21] Appl. No.: 613,378

[22] Filed: May 23, 1984

[30] Foreign Application Priority Data

May 24, 1983 [JP] Japan .................................. 58-91209

[51] Int. Cl.$^4$ .............................................. B60T 17/18
[52] U.S. Cl. ...................................... 303/92; 303/116
[58] Field of Search ................... 303/10, 92, 115, 116, 303/119

[56] References Cited

U.S. PATENT DOCUMENTS

| | | | |
|---|---|---|---|
| 3,747,990 | 7/1973 | Tanguy .................................. | 303/92 |
| 3,788,710 | 1/1974 | Von Grunberg et al. ........ | 303/92 X |
| 3,981,543 | 9/1976 | Atkins .................................. | 303/92 |
| 4,278,300 | 7/1981 | Bacher ................................ | 303/115 |

Primary Examiner—Duane A. Reger
Attorney, Agent, or Firm—Leydig, Voit & Mayer

[57] ABSTRACT

Herein disclosed is a vehicular anti-lock system of the type, in which a valve mechanism is disposed in a main passage which connects a master cylinder and a brake system such that its opening and closing operations are controlled by the movement of a control piston having its one end subjected to the pressure of the brake system. A fail-safe piston is made movable in a cylinder and has its one end engaging with the valve seat member of the valve mechanism and its other end connected with a liquid pressure source which is independent of the master cylinder. The control piston is made movable in the fail-safe piston and has its other end facing a control chamber. Between the liquid pressure source and the control chamber, there is connected a first valve which is adapted to be closed in response to a brake releasing signal. Between the control chamber and a reservoir, there is connected a second valve which is adapted to be opened in response to the brake releasing signal. A bypass passage is disposed in parallel with the valve mechanism and is adapted to be closed when the fail-safe piston is caused to bring the valve seat member into engagement with the wall of the valve chamber by the pressure of the liquid pressure source.

3 Claims, 2 Drawing Figures

ANTI-LOCK SYSTEM FOR VEHICLES

BACKGROUND OF THE INVENTION

1. Field of the Invention

The present invention relates to an anti-lock system for eliminating the lock of wheels, which might otherwise be caused when a vehicle is braked, by releasing the braking force thereby to ensure the satisfactory braking stability.

2. Description of the Prior Art

In the prior art, there have been proposed a variety of anti-lock methods for preventing the vehicular wheels from being locked. In this anti-lock control, in short, the braking pressure once raised is dropped in response to the detection of the occurence of the wheel lock in terms of the excessive braking force thereby to prevent the wheels from sliding on the road, and the braking pressure is accumulated again, when the wheel lock is released, to prevent the braking distance from being elongated to an unnecessary extent. Thus, the anti-lock system is required to have a very high responsiveness that a series of the hydraulic controls described in the above have to be promptly performed.

As this anti-lock system, moreover, there have been proposed a variety of systems including, in recent years, one example which is applied to an existing car of compact type having its braking pressure controlled by means of an electromagnetic valve.

Despite of this fact, however, the existing control system of the type using the electromagnetic valve is advantageous in that its size can be reduced. Since the controlling cycle is slow (that is to say, the responsiveness is bad), however, the behaviors of the wheels being braked are not smooth to shake the handle. On the other hand, the system of the type, in which the braking oil at the brake system is pumped to the master cylinder so as to release the brake, is caused to experience the fluctuations (i.e., the so-called "kick-back") of the pedal stroke. Moreover, the system of the type using a suction pump for reapplying the braking pressure (as is disclosed in U.S. Pat. No. 4,278,300) has its control characteristics of the release and reapplication of the braking pressure dominated by the performance of the pump, thus raising a problem that the fine control is difficult.

SUMMARY OF THE INVENTION

In view of the background thus far described, we have succeeded in conceiving the present invention after many investigations with a view to developing a novel anti-lock system which is excellent in both the control responsiveness to the brake releasing and recharging operations when the wheel lock occurs and the selectiveness in the control stages. Specifically, it is an object of the present invention to provide an anti-lock system which is enabled to take control modes suitable for dropping, reapplying and holding the braking pressure in response to two signals, i.e., a brake releasing signal and a brake reapplying signal generated for the anti-locking operation in accordance with the patterns such as the abrupt drop or restoration of the wheel speed detected in an electric manner and which has little adverse affect upon the pedal stroke.

According to a major feature of the present invention, there is provided a vehicular anti-lock system comprising: a valve mechanism disposed in a passage connecting a master cylinder and a brake system and including a valve seat member made movable in a valve chamber, a valve seat formed on said valve seat member, and a valve member made engageable with said valve seat; a fail-safe piston made movable in a cylinder and having its one end engaging with said valve seat member and its other end connected with a liquid pressure source which is independent of said master cylinder; a control piston made movable in said fail-safe piston and having its one end operationally engaging with said valve member and subjected to the pressure of said brake system and its other end facing a control chamber; a first valve connected between said liquid pressure source and said control chamber and adapted to be closed in response to a brake releasing signal; a second valve connected between said control chamber and a reservoir and adapted to be opened in response to said brake releasing signal; and a bypass passage disposed in parallel with said valve mechanism and adapted to be closed when said fail-safe piston is caused to bring said valve seat member into engagement with the wall of said valve chamber by the pressure of said liquid pressure source.

BRIEF DESCRIPTION OF THE DRAWINGS

Other objects, features and advantages of the present invention will become apparent from the following description taken in conjunction with the accompanying drawings, in which.

DESCRIPTION OF THE PREFERRED EMBODIMENTS

The present invention will be described in the following in connection with the embodiments thereof with reference to the accompanying drawings.

Embodiment 1

Figure 1:
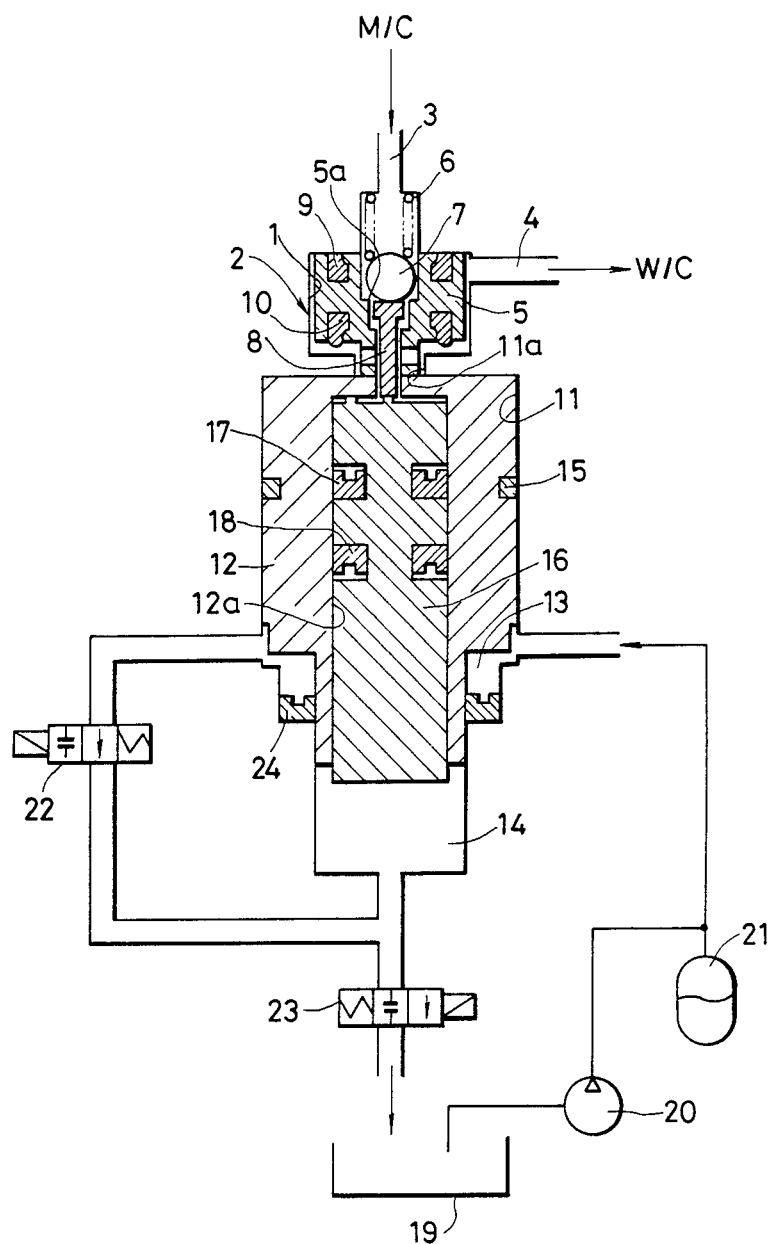
FIG. 1 is a schematic view showing an anti-lock system according to a first embodiment of the present invention.

FIG. 1 schematically shows the construction of the first embodiment. Indicated at reference numeral 1 in FIG. 1 is a valve chamber in which a one-way valve 2 is fitted. The valve chamber 1 is connected through a port 3 with a master cylinder M/C and through a port 4 with the wheel cylinder W/C of a brake system. The one-way valve 2 is composed of: a valve seat member 5 which is normally held in the shown position by the action of a later-described fail-safe piston; a ball 7 which is biased onto the valve seat 5a of the valve seat member 5 by the action of a spring 6; and a retaining lever 8 which is operative to normally separate the ball 7 from the valve seat 5a, as shown. With these components, the one-way valve 2 can be normally opened to feed the fluid pressure from the master cylinder M/C to the wheel cylinder W/C. This pressure feed passage is used as a main passage. In this one-way valve 2, moreover, when the retaining lever 8 is moved downward of the drawing, the ball 7 is seated on the valve seat 5a to allow the fluid pressure to return only to the master cylinder M/C. Still morover, when a liquid pressure source fails so that the valve seat member 5 is moved downward of the drawing, as will be described hereinafter, first and second seal members 9 and 10 switch the engagement with the valve chamber wall to open the bypass of the main passage.

Indicated at numeral 11 is a cylinder which has its one end facing the main passage and its other end facing a fluid chamber of another hydraulic system. In this embodiment, the opening 11a at the one end of the cylinder 11, which faces the main passage, can have its communication with the main passage blocked as a result that the second seal member 10 of the valve seat member 5 engages with the end portion of the opening 11a.

Indicated at numeral 12 is a fail-safe piston which is slidably fitted in the cylinder 11. The fail-safe piston 12 in the present embodiment is bored with a vertical cylinder 12a and has its other end portion so stepped as to have its step facing a first control chamber 13 and its reduced other end facing a second control chamber 14. Indicated at numeral 15 is a seal member which is mounted in the fail-safe piston 12 for effecting the liquid-tight sea with the cylinder 11.

Indicated at numeral 16 is a control piston which is slidably fitted in the vertical cylinder 12a of the fail-safe piston 12. The control piston 16 has its one end facing the second control chamber 14 so that it is biased to the other end thereof by the pressure of the second control chamber 14 to normally bias the retaining lever 8 and the ball 7 against the spring 6, as shown, thereby to hold the aforementioned one-way valve 2 in its open state. Incidentally, numerals 17 and 18 indicate piston cups for gas-tight sealing the control piston 16 and the vertical cylinder 12a of the fail-safe piston 12. By the pressure in the first control chamber 13, the fail-safe piston 12 is pushed upward, and the seal 9 is brought into engagement with the upper wall of the valve chamber 1.

The hydraulic control mechanism for supplying and releasing the fluid pressure to and from the afore-mentioned first and second control chambers 13 and 14 will be described in the following. The control mechanism is composed of: a circuit leading from a reservoir 19 through a hydraulic pump 20 and an accumulator 21 to the first control chamber 13; a circuit leading from this first control chamber 13 through a normally open type first electromagnetic valve 22 to the second control chamber 14; and a circuit leading from this second control chamber 14 through a normally closed type second electromagnetic valve 23 to the aforementioned reservoir 19.

Here, the first electromagnetic valve 22 is of the normally open type, in which it is normally in a state to transmit the fluid pressure, as shown, whereas the second electromagnetic valve 23 is of the normally closed type in which it is normally in a state to block the transmission of the fluid pressure, as shown. As a result, the fluid pressure is normally held in the first and second control chambers 13 and 14, and the control piston 16 and the fail-safe piston 12 are biased to the shown position.

If, in this state, the fluid pressure is generated in the master cylinder M/C so as to brake the vehicle, it is transmitted through the one-way valve 2 held in the normally open state to the wheel cylinder W/C so that the ordinary braking operation is conducted.

In case the wheel lock is invited when the vehicle is braked, moreover, the aforementioned first and second electromagnetic valves 22 and 33 are opened and closed in response to a brake releasing signal $S_1$ and a brake reapplying signal $S_2$ which are generated from a separately disposed electric control circuit by metering the dropping and rising characteristics of the wheel speed. As a result, the pressure in the second control chamber 14 is dropped, raised again and held to control the braking pressure so that the suitable slipping ratio with the road may be maintained while the wheels being prevented from being locked.

When the brake releasing signal $S_1$ is generated, more specifically, the wheel speed abruptly drops to invite the wheel locked state. As a result, the closing operation of the first electromagnetic valve 22 and the opening operation of the second electromagnetic valve 23 can be simultaneously effected. As a result, the fluid pressure in the second control chamber 14 leaks into the reservoir 19 so that the pressure upon the control piston 16 abruptly drops. Since this control piston 16 has its one end subjected to the pressure from the main passage, on the other hand, it is moved to its other end side (i.e., downwardly of the drawing). At the initial stage of this downward movement, moreover, the retaining lever 8 follows so that the ball 7 is seated upon the valve seat 5a by the action of the spring 6 to block the communication of the main passage between the master cylinder M/C and the wheel cylinder W/C. As a result that the control piston 16 further moves, still moreover, the capacity of the vertical cylinder 12a at the side of the main passage is increased so that the braking pressure (i.e., the fluid pressure at the wheel cylinder W/C) is abruptly dropped.

As a result of this abrupt drop of the braking pressure, the excessive braking force upon the wheels is weakened so that the wheel speed begins to restore its value. This restoration is detected by the electric control circuit to interrupt the output of the brake releasing signal $S_1$. Since, at this time, any further brake releasing operation is not necessary, the fluid pressure in the first control chamber 14 may be maintained at the hydraulic level at that time. For this maintenance, both the first and second electromagnetic valves 22 and 23 are closed to hold the braking pressure.

When the drop of the aforementioned braking pressure allows the wheel speed to starts its restoration of some extent, moreover, the braking pressure may be raised again to prevent the braking distance from increasing. In the present embodiment, therefore, the first electromagnetic valve 22 is opened in response to the brake reapplying signal $S_2$ to boost the fluid pressure in the second control chamber 14. As a result, the control piston 16 is moved to its one end side to reapply the braking pressure.

Incidentally, the electric control circuit for outputting the signals $S_1$ and $S_2$ for controlling the operations thus far described may be one of the various circuits existing in the art and may also be constructed by the existing electronic circuit technique.

With the hydraulic control of the separate hydraulic system thus far described, the suitable controls of dropping, holding and reapplying the braking pressure can be conducted merely by opening and closing the first and second electromagnetic valves.

Moreover, the present embodiment is constructed such that, if the system of the accumulator 21 is broken hydraulically by some cause, the anti-lock control is released by the action of the fail-safe piston 12. As has been described hereinbefore, more specifically, the drop of the pressure in the second control chamber 14 leads to the closing operation of the one-way valve. This is undesired if the pressure drop is likewise caused by the defect of the pressure in the separate hydraulic system. In the present embodiment, therefore, the fail-safe piston 12 is left stationary by the hydraulic force of the first control chamber 13. When the separate hydraulic system becomes defective, the pressure in the first control chamber 13 is also lost so that the fail-safe piston 12 can be moved. As a result of the movement of the fail-safe piston 12, the valve seat member 5 is moved to open the bypass of the main passage (i.e., to bring the first seal member 9 apart from the wall of the valve chamber) and to close the cylinder 11 and the main passage (i.e., to bring the second seal member 10 into engagement with the wall of the valve chamber). When the separate hydraulic system becomes defective, therefore, the anti-lock system functions merely as the communication passage of the main passage.

According to the present embodiment having the construction thus far described, there can be attained an excellent effect that the braking pressure can be controlled in a desired pattern by opening and closing the electromagnetic valves. Since the fail-safe countermeasures are satisfactorily prepared at the same time, the anti-lock system raises no obstruction, when the aforementioned separate hydraulic system becomes defective, so that the utilization as the practical system can be remarkably enhanced.

Incidentally, the present embodiment conducts the controls using the two signals, i.e., the brake releasing signal $S_1$ and the brake reapplying signal $S_2$. Those controls may naturally be conducted by additionally using a brake holding signal. In short, it is sufficient that the hydraulic pressure in the aforementioned second control chamber, which has direct relations with the drop, rise and hold of the braking pressure, be suitably supplied and released by making use of the two electromagnetic valves.

Embodiment 2

Figure 2:
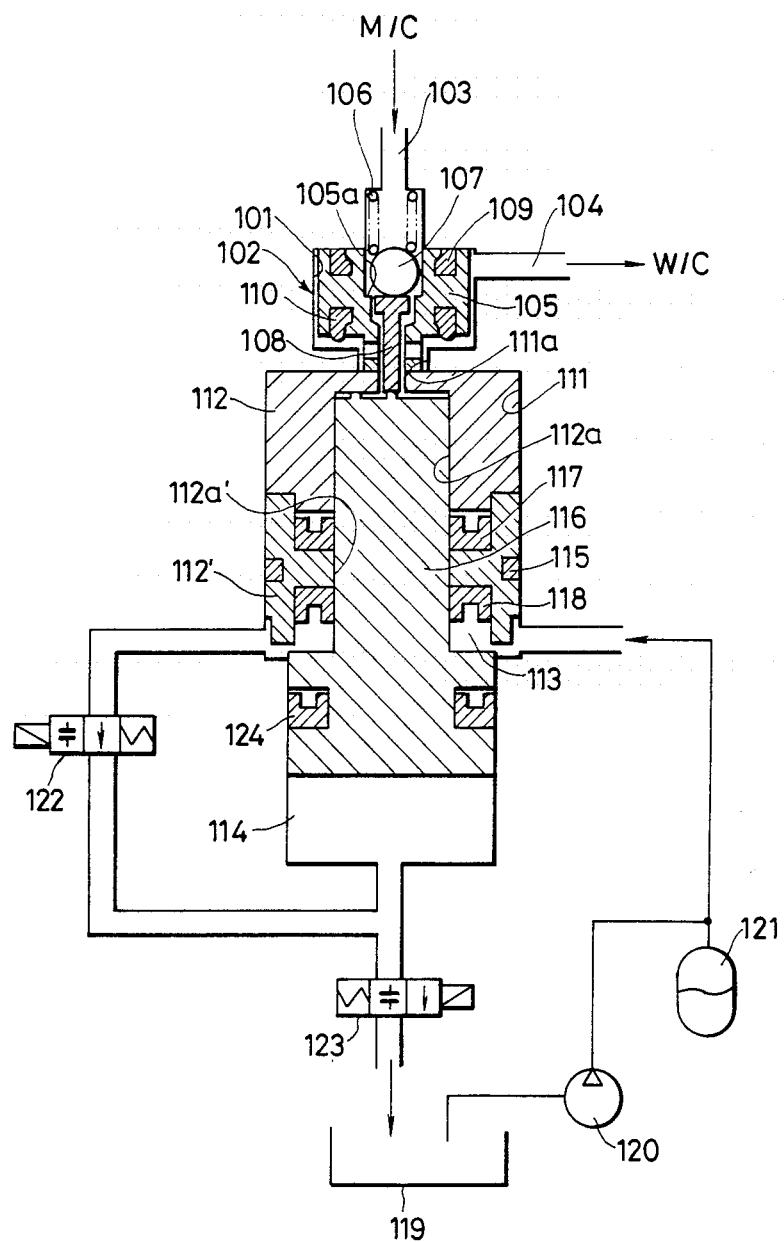
FIG. 2 is similar to FIG. 1 but shows a second embodiment of the present invention.

The present embodiment shown in FIG. 2 has substantially the same construction as that of the embodiment of FIG. 1 excepting that a control piston 116 has its other end side so stepped as to have its step facing a first control chamber 113 and its other end facing a second control chamber 114. Therefore, the same parts are indicated by adding 100 to the reference numerals, and their repeated explanations are omitted. Incidentally, fail-safe pistons 112 and 112' of the present embodiment are composed of two parts but are not substantially different in operations and effects from those of the fail-safe piston composed of one part.

The present embodiment is featured by the fact that the movement of the control piston 112 to the other side (i.e., downward of the drawing) is made faster, when in the control of the hydraulically downward movement of the second control chamber 114, by the construction of the aforementioned other end of the control piston 116, thereby to remarkably improve the responsiveness of the drop of the braking pressure to the brake releasing signal $S_1$. More specifically, the embodiment 1 has a problem that the force of moving the control piston to the other side is effected by the hydraulic force coming from the main passage so that the hydraulic force is weakened with the droop in the braking pressure. In the present second embodiment, on the other hand, the hydraulic force of the first control chamber 113 is used to move the control piston 116 so that the influence from the drop in the moving force is lightened. Despite of this fact, consideration is desired to be taken into the design so that a high vacuum may not be established in the main passage by the forced movement of the control piston.

As has been described hereinbefore, the vehicular anti-lock system according to the present invention is enabled to ensure the remarkably excellent control of the braking pressure by the relatively simple construction so that it can enjoy excellent utility.

What is claimed is:

1. A vehicular anti-lock system comprising:
   a valve mechanism disposed in a passage connecting a master cylinder and a brake system and including a valve seat member made movable in a valve chamber, a valve seat formed on said valve seat member, and a valve member made engageable with said valve seat;
   a fail-safe piston made movable in a cylinder and having its one end engaging with said valve seat member and its other end connected with a liquid pressure source which is independent of said master cylinder;
   a control piston made movable in said fail-safe piston and having its one end operationally engaging with said valve member and subjected to the pressure of said brake system and its other end facing a control chamber;
   a first valve connected between said liquid pressure source and said control chamber and adapted to be closed in response to a brake releasing signal;
   a second valve connected between said control chamber and a reservoir and adapted to be opened in response to said brake releasing signal; and
   a bypass passage disposed in parallel with said valve mechanism and adapted to be closed when said fail-safe piston is caused to bring said valve seat member into engagement with the wall of said valve chamber by the pressure of said liquid pressure source.

2. A vehicular anti-lock system according to claim 1, wherein said fail-safe piston is so stepped as to have its step facing said liquid pressure source and its reduced end portion facing said control chamber.

3. A vehicular anti-lock system according to claim 1, wherein said control piston is so stepped as to have its step facing said liquid pressure source and its enlarged end portion facing said control chamber.

* * * * *